US012428879B2

(12) United States Patent
Wu et al.

(10) Patent No.: US 12,428,879 B2
(45) Date of Patent: Sep. 30, 2025

(54) SECURITY LOCK

(71) Applicant: SINOX COMPANY LTD., New Taipei (TW)

(72) Inventors: Chien-Hung Wu, New Taipei (TW); Chia-Hung Wang, New Taipei (TW)

(73) Assignee: SINOX COMPANY LTD., New Taipei (TW)

( * ) Notice: Subject to any disclaimer, the term of this patent is extended or adjusted under 35 U.S.C. 154(b) by 135 days.

(21) Appl. No.: 18/353,394

(22) Filed: Jul. 17, 2023

(65) Prior Publication Data

US 2024/0084621 A1 Mar. 14, 2024

(30) Foreign Application Priority Data

Sep. 13, 2022 (TW) ................................ 111134537

(51) Int. Cl.
*E05B 73/00* (2006.01)
*E05B 37/00* (2006.01)

(52) U.S. Cl.
CPC .......... *E05B 73/0082* (2013.01); *E05B 37/00* (2013.01)

(58) Field of Classification Search
CPC ...... E05B 73/00; E05B 73/0082; E05B 37/00; Y10T 70/5009
USPC ........................................................ 70/58
See application file for complete search history.

(56) References Cited

U.S. PATENT DOCUMENTS 5,983,679 A * 11/1999 Reyes ................. E05B 73/0082 70/168
6,058,744 A * 5/2000 Ling ..................... E05B 37/025 70/312
6,244,080 B1 * 6/2001 Sakurai ............... E05B 73/0082 70/58
6,257,029 B1 * 7/2001 Liao .................... E05B 73/0005 70/57
6,523,373 B1 * 2/2003 Su ....................... E05B 73/0005 70/426
6,886,376 B2 * 5/2005 Kuo .................... E05B 73/0005 70/57.1
7,401,481 B1 * 7/2008 Lin ..................... E05B 73/0005 70/58

(Continued)

FOREIGN PATENT DOCUMENTS

DE 202008013792 U1 * 4/2009 ........... E05B 37/025
JP 10317757 A * 12/1998 ......... E05B 73/0005

(Continued)

*Primary Examiner* — Suzanne L Barrett
(74) *Attorney, Agent, or Firm* — Best & Flanagan LLP

(57) ABSTRACT

A security lock has a fixing element and at least one hook. The fixing element is mounted in a security slot of an electronic device. The hook is capable of moving axially with respect to the fixing element, and the hook moves radially outward along a guiding structure of the fixing element to engage with the security slot, the fixing element stays static, i.e., without moving and rotating as the hook is moving. Therefore, the security lock won't press the security slot, and further prevents damage to the security slot caused by frequently or constantly loaded with the security lock. Furthermore, without moving and rotating in a mounting process of the security lock, the fixing element holds the hook to steadily engage with the security slot, and thus an overall anti-pulling and anti-pushing performances are enhanced.

16 Claims, 16 Drawing Sheets

(56) References Cited

U.S. PATENT DOCUMENTS

| | | | | |
|---|---|---|---|---|
| 8,505,344 | B2 * | 8/2013 | Su | E05B 73/0005 70/491 |
| 8,991,225 | B2 | 3/2015 | Wu et al. | |
| 9,137,911 | B2 * | 9/2015 | Avganim | H05K 5/0208 |
| 10,378,249 | B1 * | 8/2019 | Lee | E05B 73/0082 |
| 2004/0168486 | A1 * | 9/2004 | Ling | E05B 73/0082 70/58 |
| 2006/0081021 | A1 * | 4/2006 | Merrem | E05B 73/0082 70/58 |
| 2010/0180648 | A1 * | 7/2010 | Knox | E05B 73/0082 70/58 |
| 2012/0216581 | A1 * | 8/2012 | Tsai | E05B 73/0082 70/58 |
| 2013/0180295 | A1 | 7/2013 | Avganim | |
| 2013/0340490 | A1 * | 12/2013 | Wu | E05B 73/0082 70/58 |
| 2019/0226243 | A1 | 7/2019 | Lee | |
| 2020/0173201 | A1 * | 6/2020 | Avganim | E05B 73/0005 |
| 2020/0181950 | A1 | 6/2020 | Su | |
| 2020/0224451 | A1 * | 7/2020 | Su | E05B 73/0082 |

FOREIGN PATENT DOCUMENTS

| | | | |
|---|---|---|---|
| JP | 2005179918 | A | 7/2005 |
| JP | 2007154520 | A | 6/2007 |
| JP | 2007332641 | A | 12/2007 |
| JP | 3216123 | U | 5/2018 |
| JP | 3227280 | U | 8/2020 |
| JP | 2021102911 | A | 7/2021 |
| TW | 642835 | | 12/2018 |
| TW | 583478 | U | 9/2019 |

* cited by examiner

SECURITY LOCK

1. FIELD OF THE INVENTION

The present invention relates to a security lock, especially to a security lock that is compatible with a security slot of a laptop.

2. DESCRIPTION OF THE PRIOR ARTS

In order to avoid theft, a security slot is usually set on an electronic device, especially a portable electronic device such as a laptop, and the security slot is compatible with a particular lock such as a security lock, and thereby the laptop is fixed to a position to avoid theft.

A conventional security lock includes a casing, a pushing stick, two hooks, a spring, and a fixing structure. The pushing stick is movably mounted in the casing and is capable of moving along a longitudinal direction, and protrudes to an exterior of the casing. The two hooks are laterally movably mounted in the casing and protrude to the exterior of the casing. Besides, two inclined guiding structures are mounted on a top surface and a bottom surface of the pushing stick respectively, and the two hooks are mounted in the two guiding structures. The spring is mounted between an inner wall surface of the casing and the pushing stick, and the spring pushes the pushing stick outwardly. When the pushing stick compresses the spring and retracts to an interior of the casing for a certain distance, the fixing structure engages with the pushing stick, and thereby the pushing stick keeps in position along the longitudinal direction.

To mount the security lock on a device, first, insert the pushing stick into the security slot and abuts the pushing stick on an inner surface facing an opening of the security slot; then push the casing toward the security slot, in another aspect, the pushing stick retracts with respect to the casing. The two hooks which move toward the security slot with the casing move obliquely and outwardly along the two guiding structures of the pushing stick, and further engage with two lateral inner wall surfaces of the security slot which is trapezoidal. When the casing is pushed to move for a certain distance, the fixing structure engages with the pushing stick to keep the position of the pushing stick along the longitudinal direction, and thereby the two hooks are not capable of retracting and thus keeping engaging with the security slot.

To dismount the security lock from the device, switch the security lock into an unlocked state, and thus the fixing structure no longer engages with the pushing stick; the spring then pushes the casing away from the security slot, and further drives the two hooks to retract obliquely along the guiding structure to disengage from the security slot.

However, the aforementioned conventional security lock has two disadvantages as follows:

First, whenever the security lock is mounted on the device, the pushing stick has to abut the inner surface facing the opening of the security slot and the casing is pushed with force to compress the spring, and thereby the inner surface facing the opening of the security slot is pressed by the pushing stick. The security slot may be damaged like the inner surface facing the opening of the security slot splitting due to frequent or constant pressing by the pushing stick.

Especially the security slot is integrally formed on a casing of the device, and therefore, it costs much and is not environmentally friendly once the security slot is damaged because the whole casing of the device will need to be replaced. In addition, devices with the security slots frequently used are usually expensive, and it is particularly hard for users to accept that expensive devices are easily damaged under normal usage, and to afford high cost of replacing the damaged casings of the devices.

Second, the pushing stick is movable with respect to the casing, such that the pushing stick is not a steady support, and furthermore, the hooks are also movable; a combination of the pushing stick and the hooks is distinctly unstable. However, the combination of the pushing stick and the hooks is supposed to engage with the security slot, and it is apparently difficult to firmly engage with the security slot. Anti-pulling performance along the longitudinal direction (the x-axis), and anti-pushing performance at two directions perpendicular to each other (y-axis and z-axis) of the conventional security lock are both insufficient, and thus the conventional security lock is not effective in avoiding theft.

To overcome the shortcomings, the present invention provides a security lock to mitigate or obviate the aforementioned problems.

SUMMARY OF THE INVENTION

The main objective of the present invention is to provide a security lock that is configured to be mounted in a security slot without pressing the security slot to prevent damage to the security slot.

The security lock is configured to fix an electronic device which has the security slot, and the security lock comprises a fixing element and two hooks. The fixing element is configured to be axially mounted in the security slot of the electronic device, and two guiding structures are formed on the fixing element. The two hooks are capable of moving axially with respect to the fixing element, and the two hooks respectively move radially outward in opposite directions along the two guiding structures of the fixing element to engage in the security slot during a process of moving axially with respect to the fixing element. Wherein, when the fixing element is mounted in the security slot, the fixing element stays static as the two hooks are moving with respect to the fixing element to engage in the security slot. Wherein, when the two hooks move toward the security slot with respect to the fixing element, each one of the two hooks moves in a curved path with respect to the fixing element to engage in the security slot, and said curved path is concave outward with respect to the security slot to increase a distance between two outer ends of the two hooks when the two hooks move toward the security slot.

To mount the security lock in the security slot, first insert the fixing element into the security slot of the electronic device, and then move the hook toward the security slot with respect to the fixing element; the hook moves radially outward along the guiding structure of the fixing element to engage with the security slot. In the aforementioned process, the fixing element stays static without any displacement in the locations or the angles with respect to a casing of the security lock and the security slot, but only the hook moves instead.

Through said mounting process, the security lock will not press the security slot, and further prevent structural damage to the security slot caused by frequently or constantly loaded with the security lock. Besides, the fixing element will not move or rotate in said mounting process, thus being a steady support to hold the hook and further supporting the hook steadily to engage with the security slot. Therefore, an overall anti-pulling performance and anti-pushing performances in two perpendicular directions are effectively enhanced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
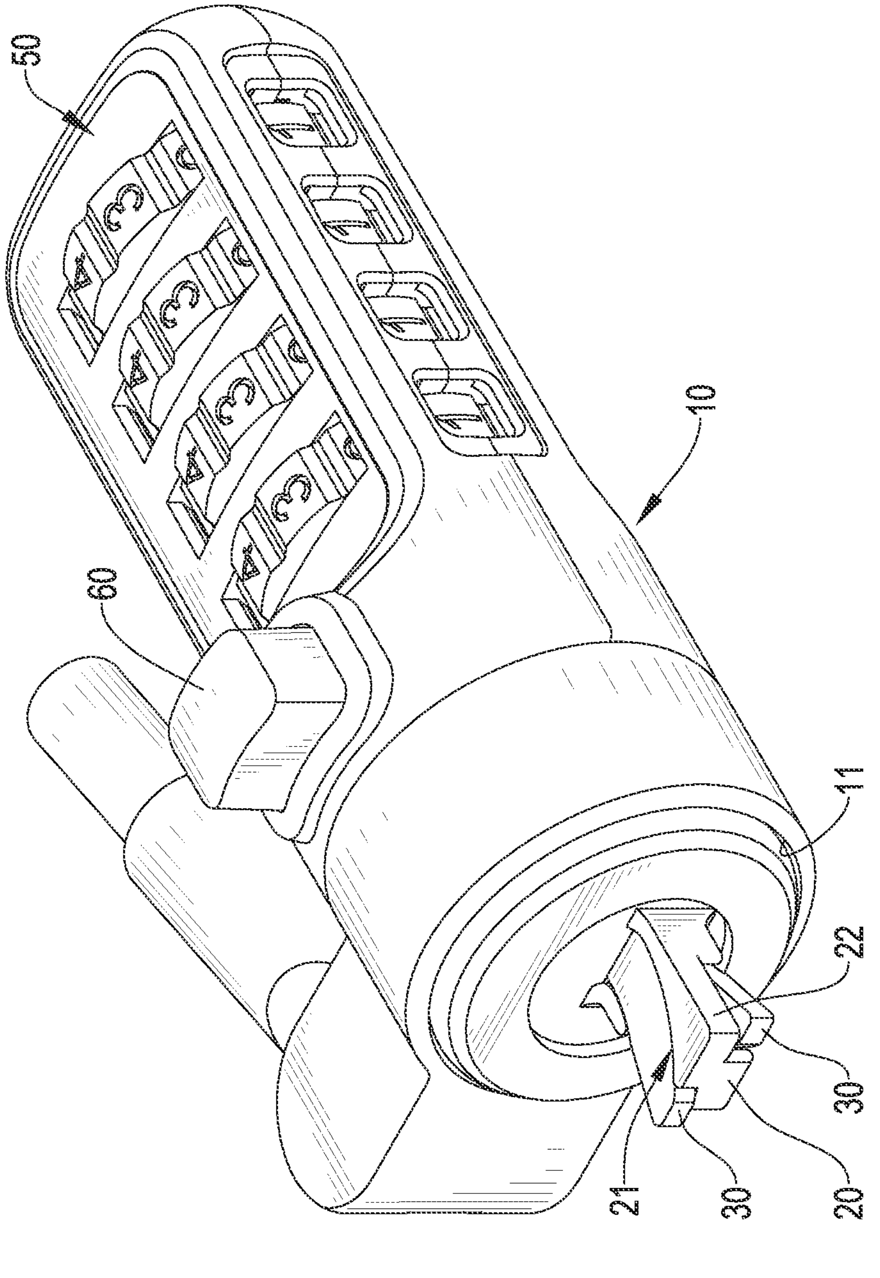
FIG. 1 is a perspective view of a first embodiment of a security lock in accordance with the present invention.
Figure 2:
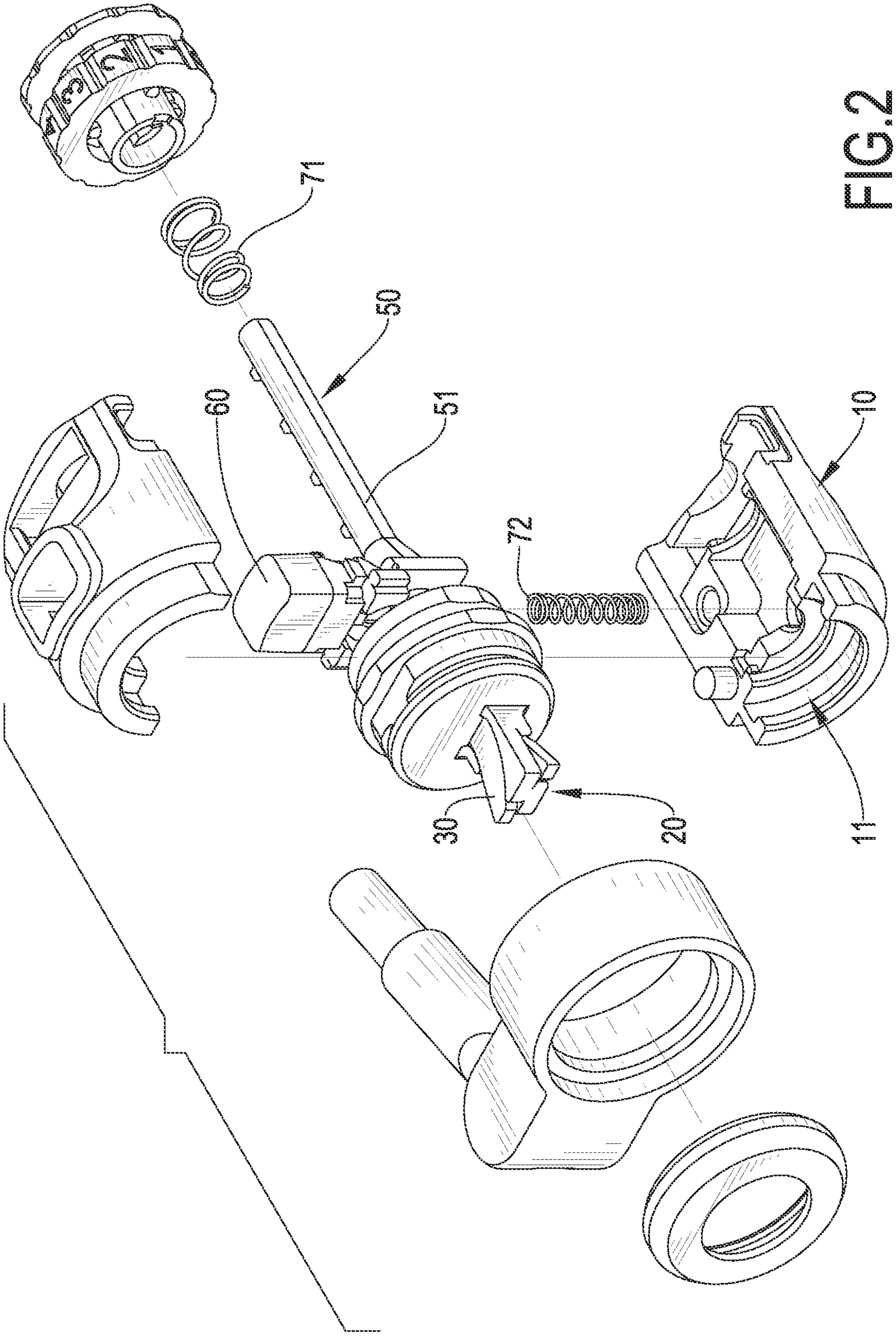
FIGS. 2 and 3 are exploded views of the first embodiment of the security lock.
Figure 4:
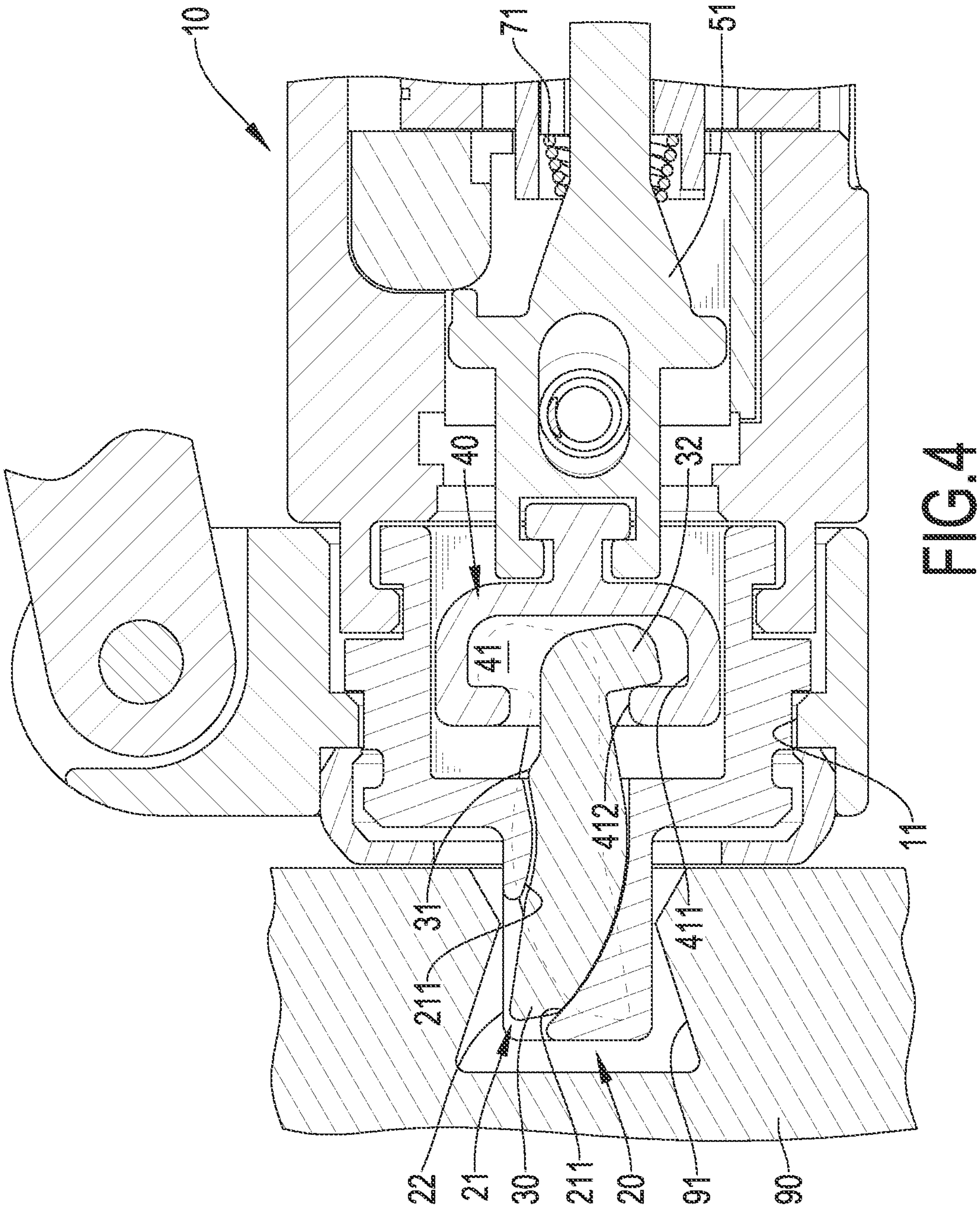
FIGS. 4 and 5 are top cross-sectional views of the first embodiment of the security lock, showing serial operational movements of the security lock.

With reference to FIGS. 1, 2 and 4, a first embodiment of a security lock in accordance with the present invention is configured to fix an electronic device 90, the electronic device 90 has a security slot 91, and the security lock includes a fixing element 20 and at least one hook 30. In this embodiment, the security lock has two said hooks 30, but in another embodiment, the security lock may have only one said hook 30. In addition, the security lock further has a casing 10, a hook base 40, a lock core 50, and an unlocking element 60.

The casing 10 has an opening 11 corresponding to the security slot 91, and the opening 11 may be located at an end of the casing 10.

The fixing element 20 is configured to be axially mounted in the security slot 91 of the electronic device 90, and at least one guiding structure 21 is formed on the fixing element 20. In this embodiment, the security lock has two of the guiding structures 21 to match the two hooks 30.

Figure 3:
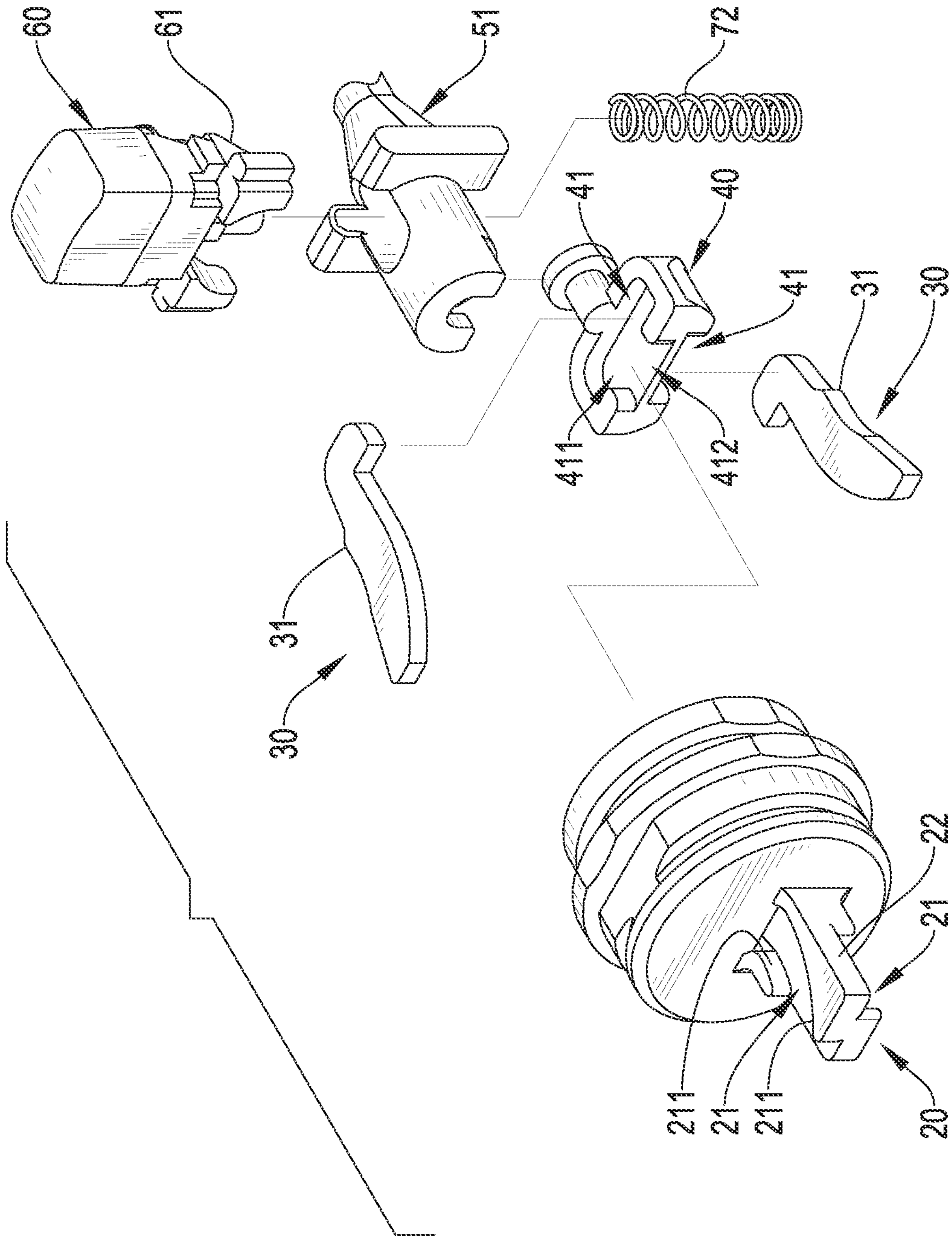
Figure 5:
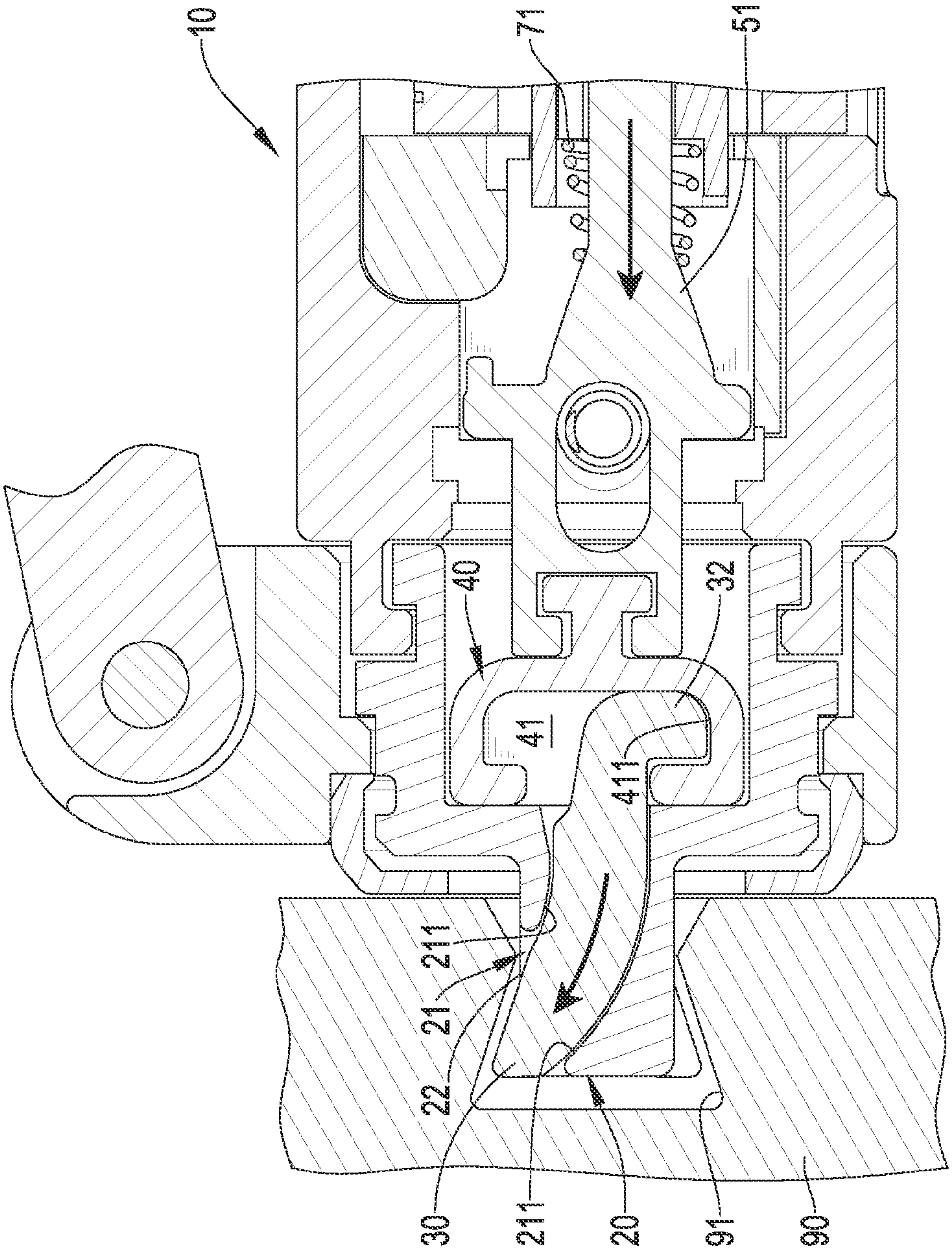
Figure 6:
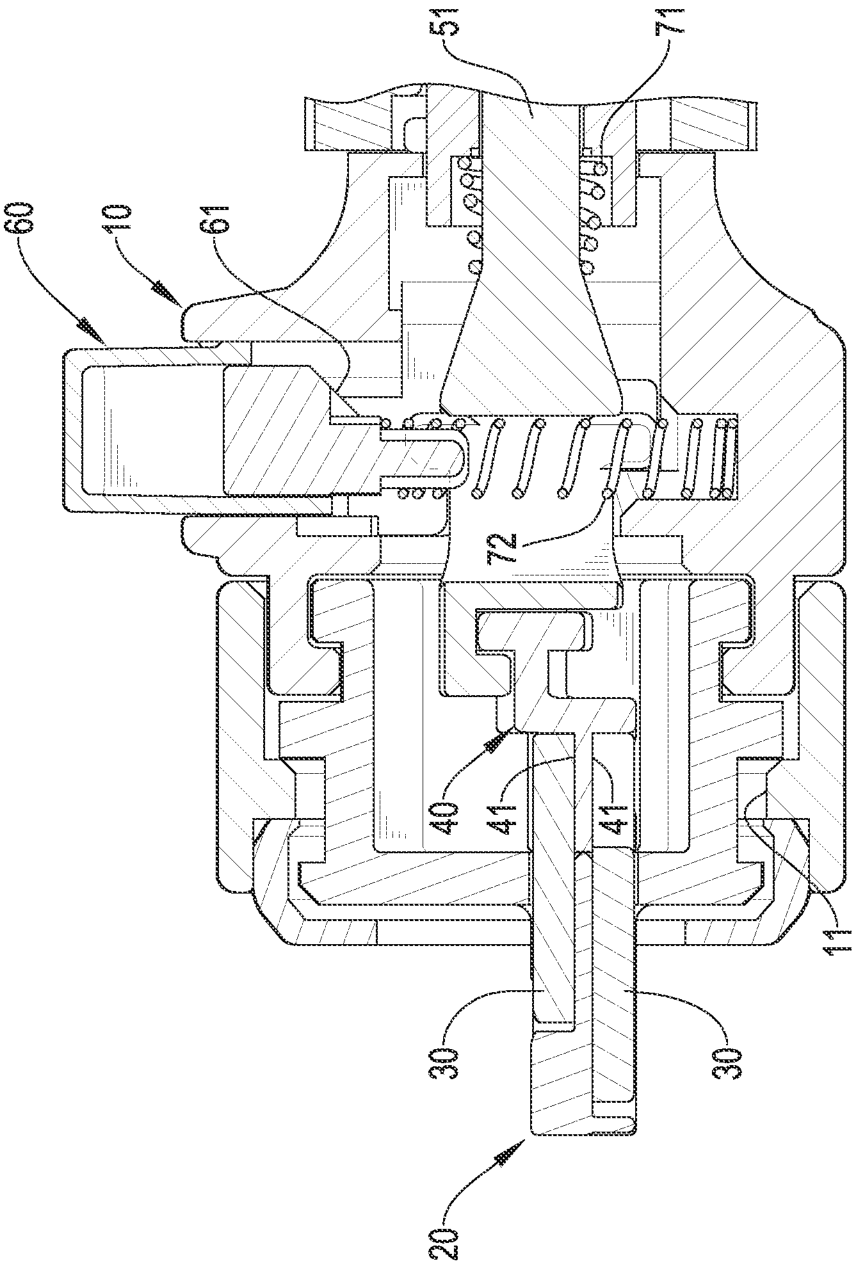
FIGS. 6 and 7 are lateral cross-sectional views of the first embodiment of the security lock, showing serial operational movements of the security lock.
Figure 7:
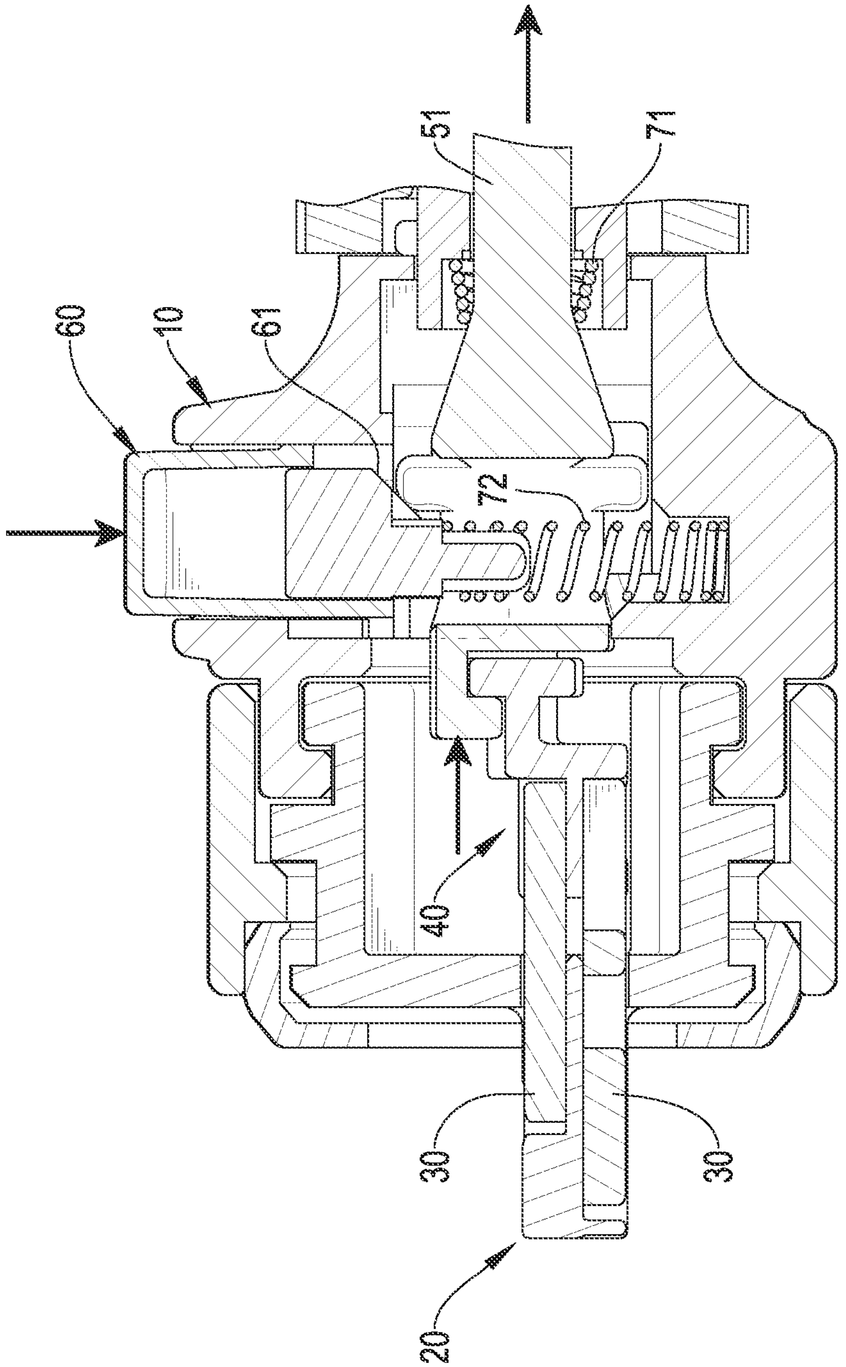

As shown in FIGS. 3 to 5, the hook 30 is capable of moving axially with respect to the fixing element 20, and as the hook 30 is moving axially with respect to the fixing element 20 toward the security slot 91, the hook 30 moves radially outward along the guiding structure 21 of the fixing element 20 to engage in the security slot 91. Moreover, when the fixing element 20 is mounted in the security slot 91, the fixing element 20 stays static as the hook 30 is moving with respect to the fixing element 20 to engage in the security slot 91, i.e., the fixing element 20 does not have any displacement in locations or angles with respect to the casing 10 and the security slot 91.

With reference to the FIGS. 2, 4, and 5, the fixing element 20 is mounted at the opening 11 of the casing 10, and the fixing element 20 may be fixed on the casing 10 such that the fixing element 20 will not move or rotate with respect to the casing 10, but it is not limited thereto; there may be variations but at least the fixing element 20 will not move or rotate with respect to the casing 10 as the hook 30 is moving with respect to the fixing element 20 to engage in the security slot 91.

In this embodiment, an inner diameter of the opening 11 is approximate to an outer diameter of the casing 10, and the fixing element 20 approximately seals the opening 11, but it is not limited thereto. A cross-sectional area of the opening 11 of the casing 10 may be slightly larger than a cross-sectional area of a part of the fixing element 20 which is in the security slot 91; the cross-sectional area of the opening 11 may correspond to a cross-sectional area of the security slot 91, and thereby the cross-sectional area of the fixing element 20 corresponds to the cross-sectional area of the security slot 91.

Figure 15:
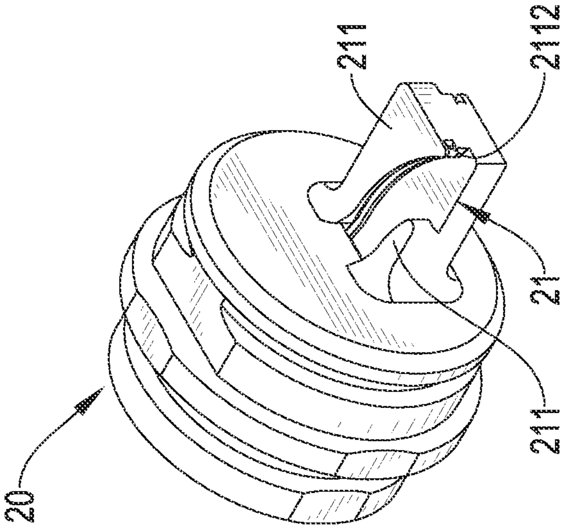
FIGS. 13 to 15 are perspective views of the first embodiment of the security lock, showing variations of the fixing elements.
Figure 14:
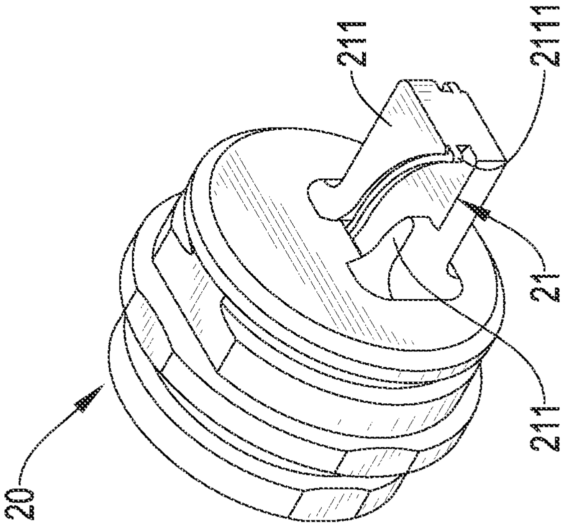
Figure 13:
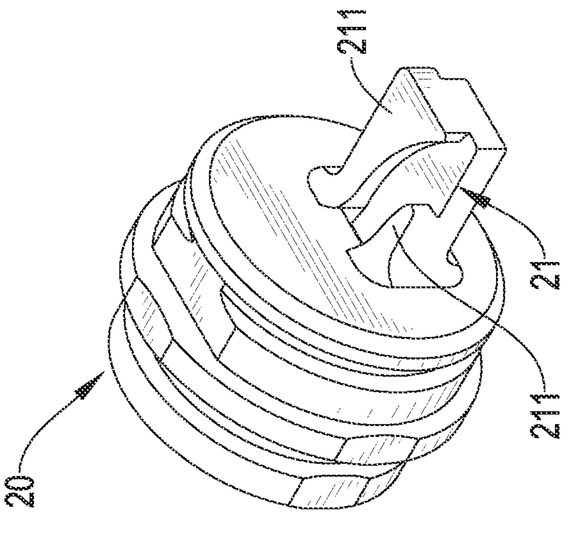
Figure 18:
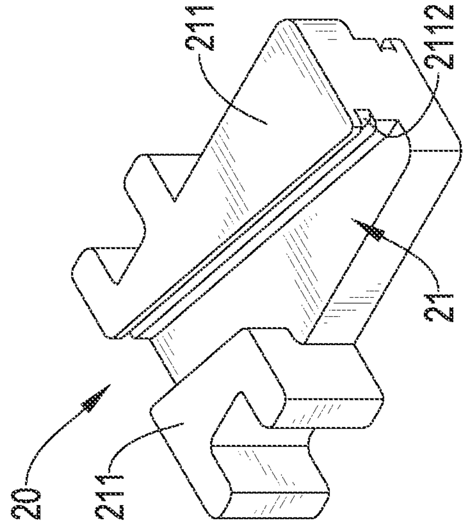
FIGS. 16 to 18 are perspective views of the second embodiment of the security lock, showing variations of the fixing elements.
Figure 17:
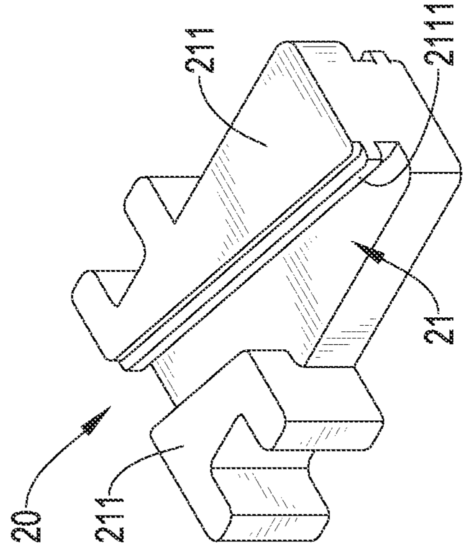
Figure 16:
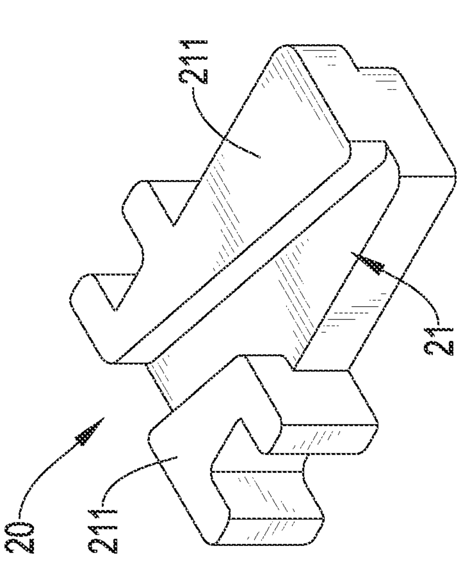
Figure 21:
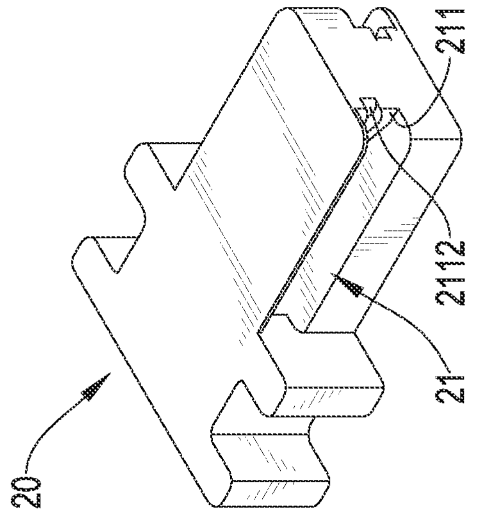
FIGS. 19 to 21 are perspective views of the second embodiment of the security lock, showing other variations of the fixing elements.
Figure 20:
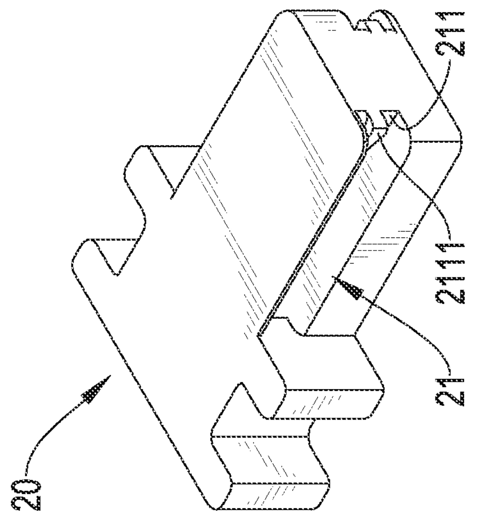
Figure 19:
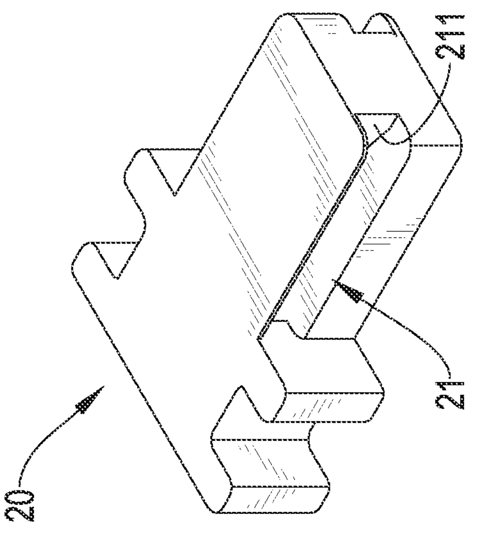

With reference to FIGS. 3 to 5, in this embodiment, each one of the guiding structures 21 of the two fixing elements 20 has at least one abutting portion 211, and when the hook 30 moves with respect to the fixing element 20, the hook 30 abuts the abutting portion 211 and thus moves radially outward. The hook 30 may abut the abutting portion 211 along a radial direction, and thus the hook 30 moves radially outward. Besides, each one of the guiding structures 21 includes two abutting portions 211, and the two abutting portions 211 are located at two radially opposite sides of the hook 30 respectively. A number of the abutting portion 211 and a direction in which the abutting portion 211 abuts are not limited as mentioned above. Besides, a site where the abutting portion 211 abuts the hook 30 may be planar as shown in FIGS. 13, 16, and 19; but the site may be non-planar instead, for example, the site may have a rib 2111 as shown in FIGS. 14, 17, and 20, or have a groove 2112 as shown in FIGS. 15, 18, and 21. Furthermore, the guiding structure 21, as well as the abutting portion 211, may be formed on an outer surface of the fixing element 20 as shown in FIGS. 13 to 18; when the fixing element 20 has two of the guiding structures 21, the two guiding structures 21 are located on two opposite surfaces of the fixing element 20 respectively; to be more precise, the two opposite surfaces include a top surface and a bottom surface of the fixing element 20. However, the guiding structure 21, as well as the abutting portion 211, may be formed in the fixing element 20 as shown in FIGS. 19 to 21, and thus a channel is formed at the guiding structures 21, but a configuration and means of the guiding structure 21 of the fixing element 20 guiding the hook 30 to move are not limited as mentioned above.

With reference to FIGS. 3 to 5, as the hook 30 is moving toward the security slot 91 with respect to the fixing element 20, the hook 30 moves radially outward such that an outer end of the hook 30 protrudes from a radial lateral wall surface 22 of the fixing element 20, thereby engaging with the security slot 91. On the other hand, when the hook 30 moves away from the security slot 91, the hook 30 moves radially inward such that the outer end of the hook 30 retracts or merely slightly protrude from the radial lateral wall surface 22 of the fixing element 20. Therefore, an overall width of a part of the security lock in the security slot 91 reduces.

As the hook 30 is moving toward the security slot 91 with respect to the fixing element 20, the hook 30 may move straight or in a curved path with respect to the fixing element 20 to engage in the security slot 91.

With reference to FIGS. 3 to 5 and FIGS. 13 to 15, in the first embodiment, the hook 30 moves in a curved path while the guiding structure 21 forms a curved track, and a fulcrum portion 31 is formed on the hook 30 and protrudes radially outward from the hook 30. When the hook 30 moves in a curved path along the guiding structure 21, the fulcrum portion 31 abuts on a lateral wall surface of the abutting portion 211 for the hook 30 to move in a curved path, but the configuration and means of guiding the hook 30 to move in a curved path are not limited thereto; for example, a fulcrum portion may be formed and protrude from the lateral wall surface of the abutting portion 211 to abut a radial outer side of the hook 30 such that the hook 30 moves in a curved path.

With reference to FIGS. 10 to 11, and FIGS. 16 to 21, in a second embodiment of the security lock, the hook 30 moves straight while the guiding structure 21 forms a straight track.

With reference to FIGS. 3 to 5, the hook base 40 is connected to an inner end of the hook 30, and the hook base 40 is capable of moving axially with respect to the fixing element 20. When the hook 30 moves away from the security slot 91 with respect to the fixing element 20, the hook base 40 guides the inner end of the hook 30 to move radially inward, and helps the hook 30 to move radially whether the hook 30 moves straight or in a curved path.

The hook base 40 may only help the hook 30 to move radially, or may help the hook 30 to move radially and drive the hook 30 as well. To be more precise, the hook base 40 may drive the hook 30 to move axially and guide the inner end of the hook 30 to move radially with respect to the fixing element 20 via pushing or pulling, etc.

In the first embodiment, when the hook 30 moves in a curved path and moves away from the security slot 91 with respect to the fixing element 20, the hook base 40 guides the inner end of the hook 30 to move radially inward, thereby helping the outer end of the hook 30 to retract.

In the first embodiment, a guiding portion 32 is formed on and protrudes radially inward from the inner end of the hook 30, and the guiding portion 32 is inserted into the hook base 40, thereby the hook base 40 being capable of moving the hook 30.

In the first embodiment, at least one hook recess 41 is formed on the hook base 40, and a number of the at least one hook recess 41 is preferably two; the two hook recesses 41 are located on two opposite surfaces of the hook base 40, and the two opposite surfaces include a top surface and a bottom surface. The two hook recesses 41 correspond to the two hooks 30 respectively, and each one of the two hook recesses 41 has a radial moving space 411 and an entrance 412 which connect to each other. A width of the entrance 412 is smaller than a width of the radial moving space 411, the guiding portion 32 of the corresponding hook is inserted into the radial moving space 411 via the entrance 412, and the guiding portion 32 is capable of moving radially in the radial moving space 411.

Figure 8:
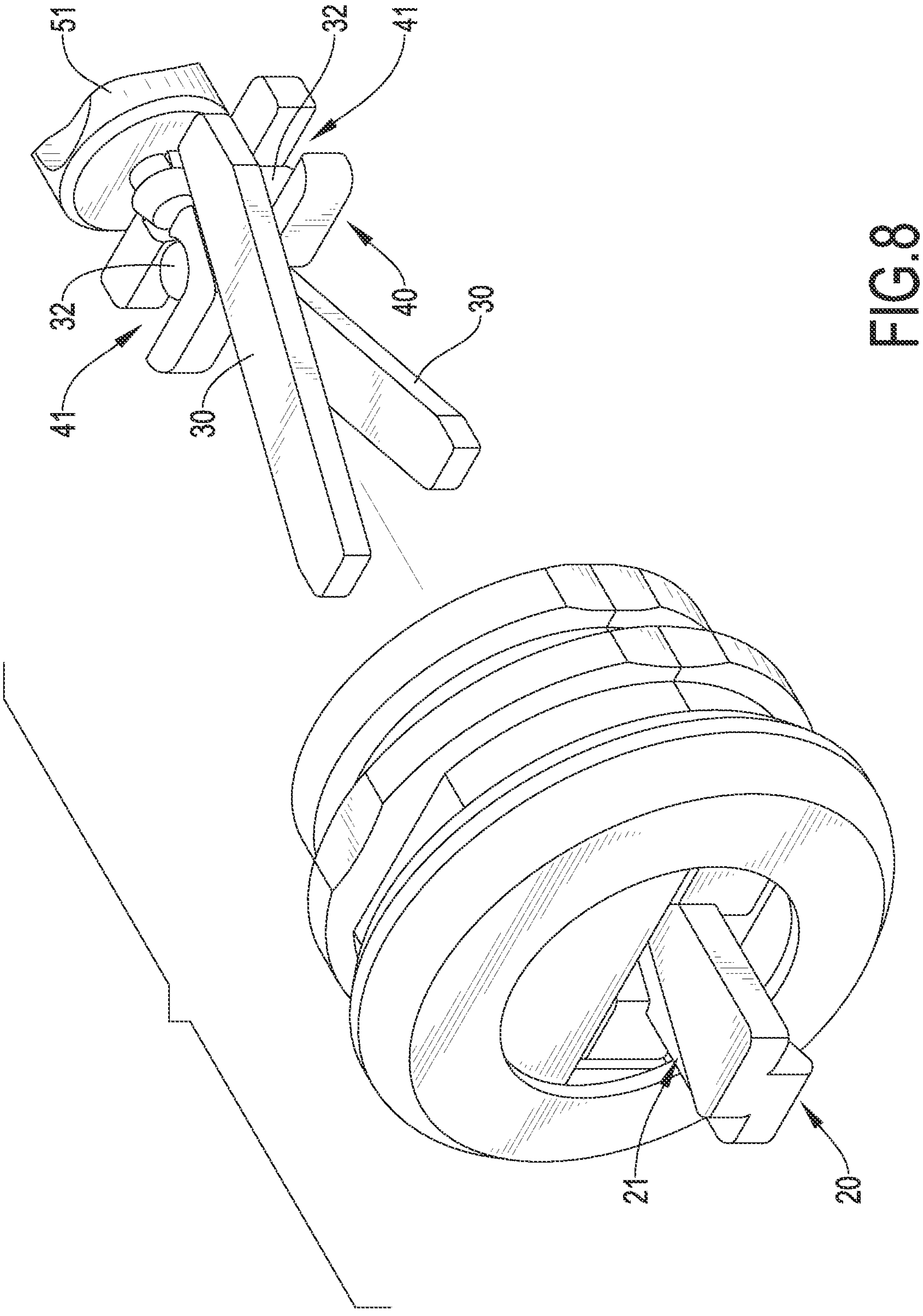
FIG. 8 is a perspective view of a second embodiment of the security lock in accordance with the present invention, showing parts of the security lock.
Figure 9:
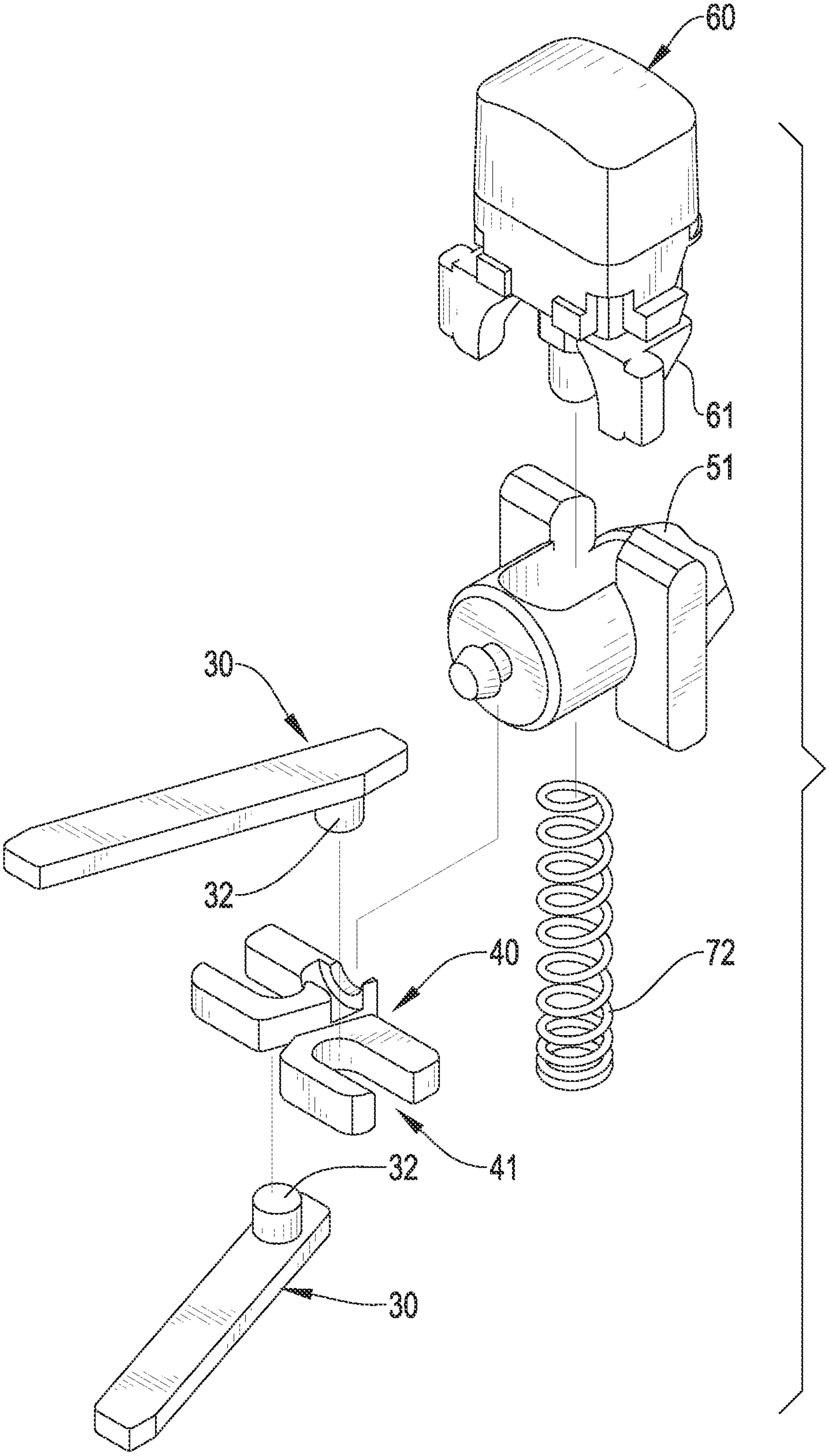
FIG. 9 is an exploded view of the second embodiment of the security lock.
Figure 10:
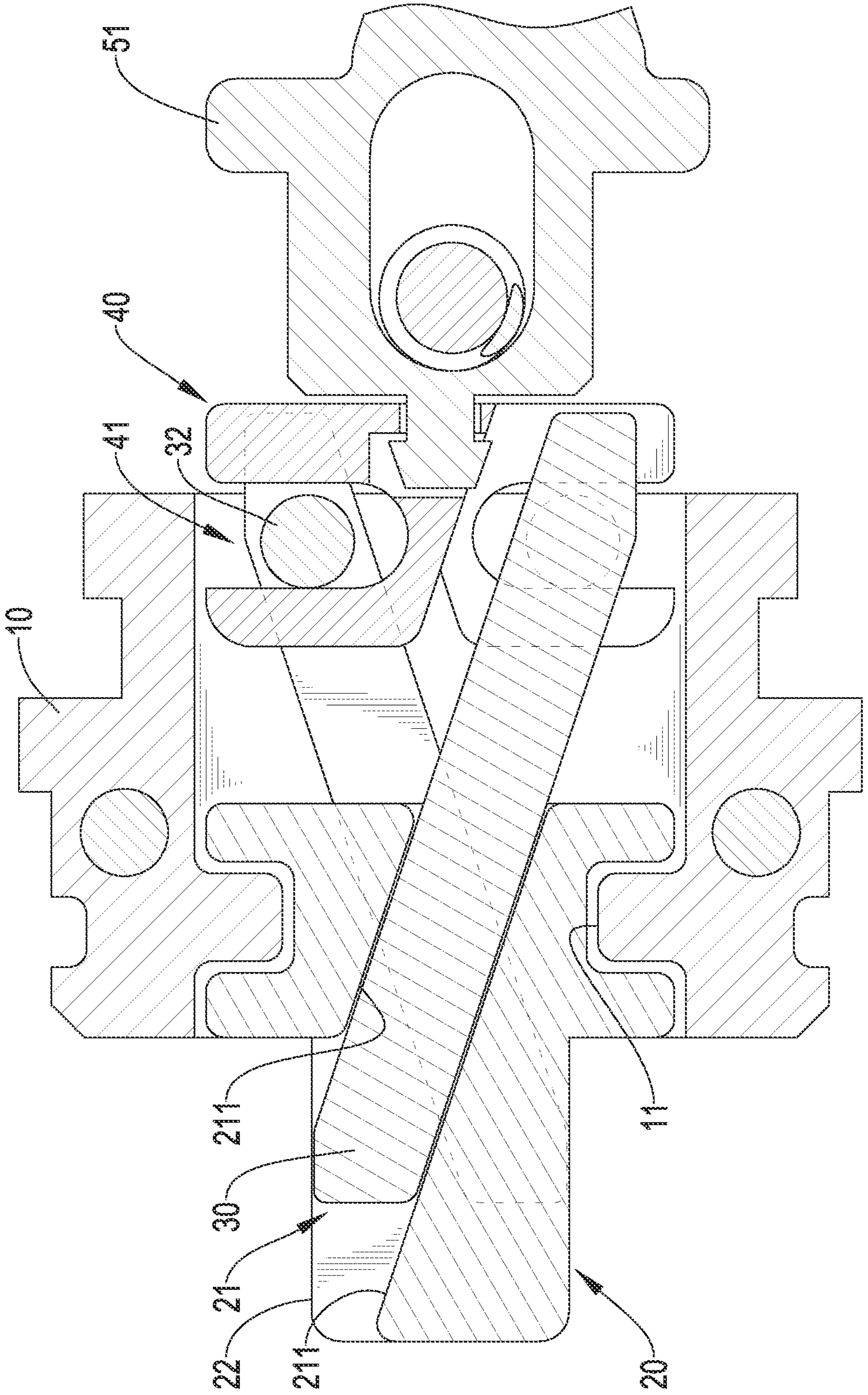
FIGS. 10 and 11 are top cross-sectional views of the second embodiment of the security lock, showing serial operational movements of the security lock.
Figure 11:
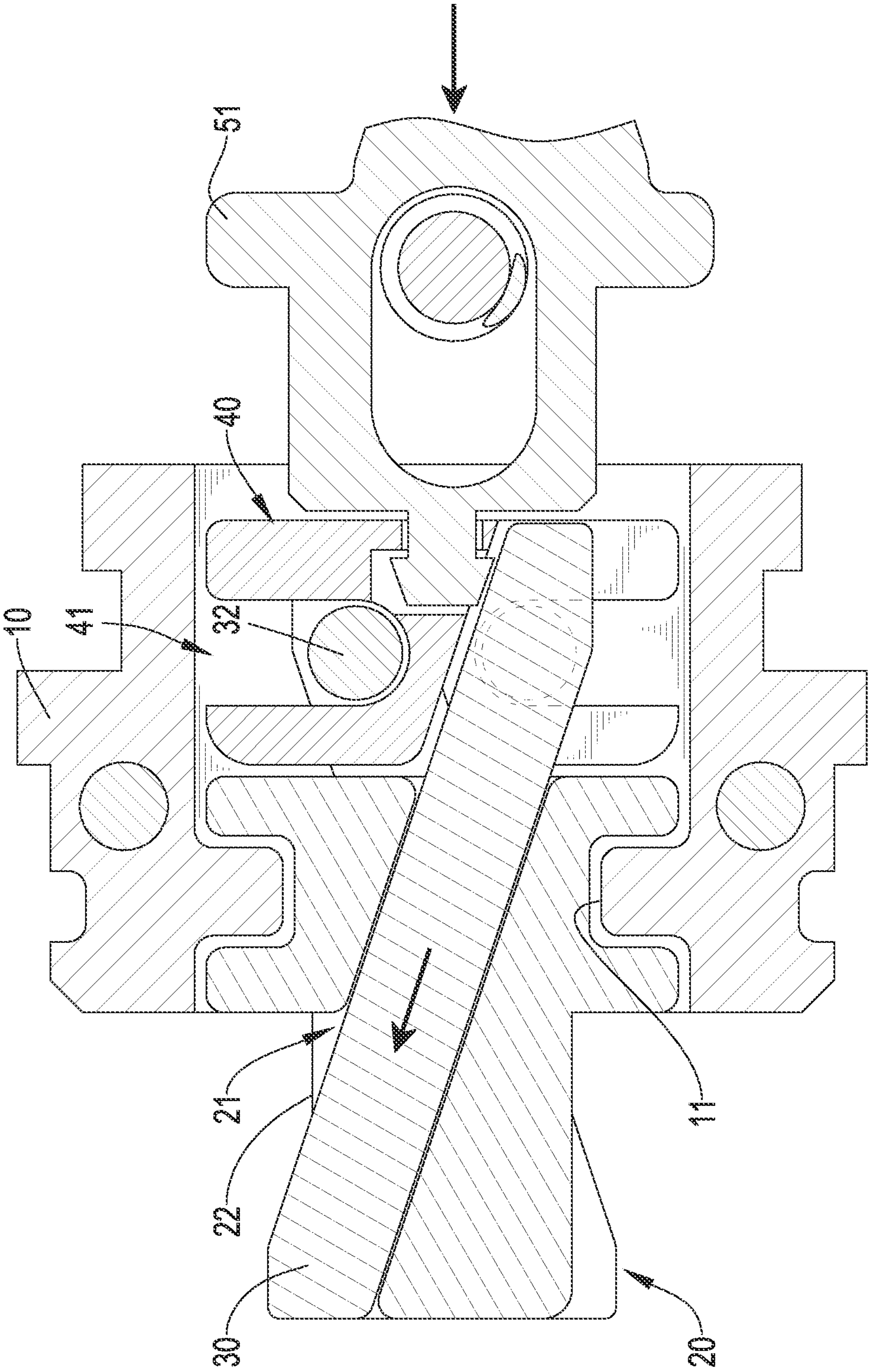
Figure 22:
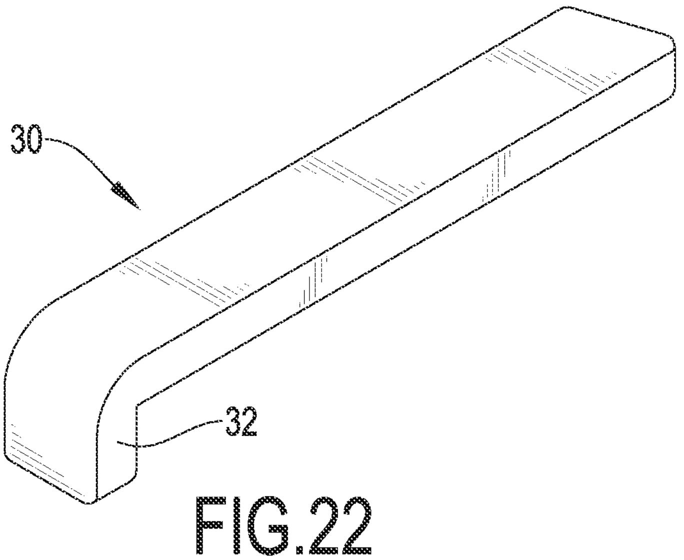
FIGS. 22 to 24 are perspective views of the second embodiment of the security lock, showing variations of the hooks.
Figure 23:
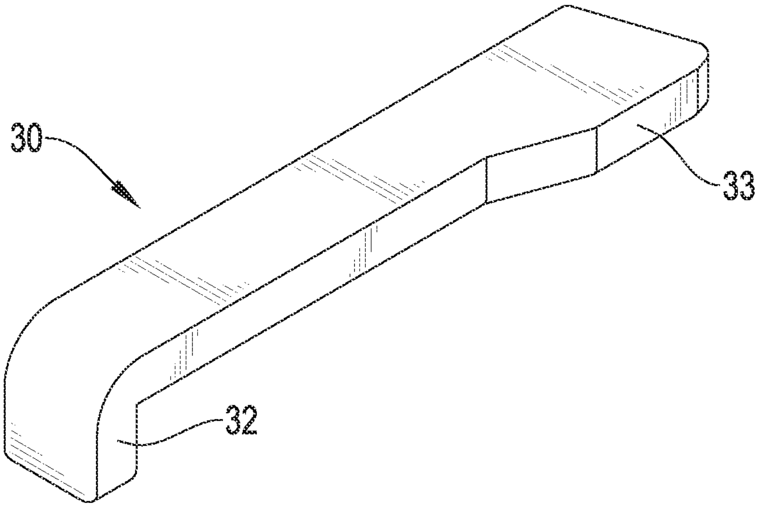
Figure 24:
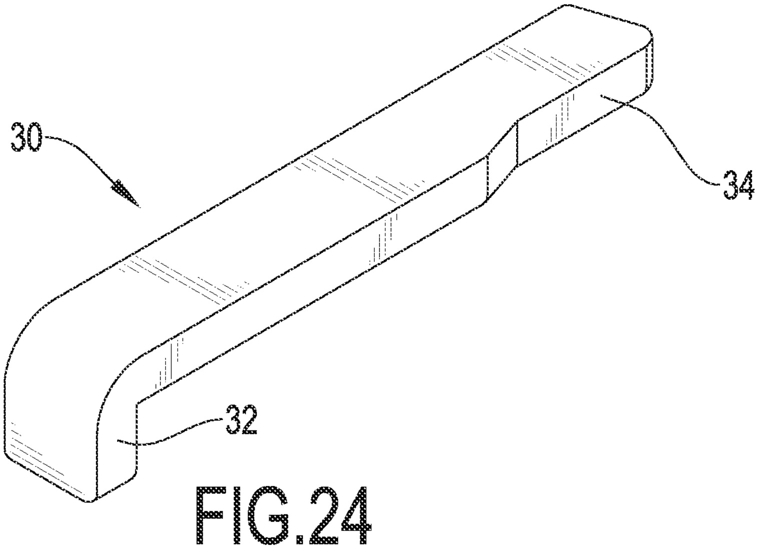

With reference to FIGS. 8 to 10, in the second embodiment, the hook recess 41 of the hook base 40 is different from the first embodiment, and an inserting direction of the guiding portion 32 of the hook 30 into the hook base 40 is different from the first embodiment. The two hooks 30 are located at two opposite sides which are top and bottom of the hook base 40, and the two guiding portions 32 of the two hooks protrude toward the hook base 40 from the two inner ends of the two hooks 30 respectively. The guiding portion 32 may be a cylinder as shown in FIG. 9, but the guiding portion 32 may be formed by folding the hook 30 which is planar instead as shown in FIGS. 22 to 24. The two hook recesses 41 of the hook base 40 extend radially, and the two hook recesses 41 are preferably located left and right and spaced apart from each other, but the two hook recesses 41 may be formed at the top surface and the bottom surface of the hook base 40 respectively instead.

Besides, with reference to FIGS. 22 to 24, a radial lateral side of the outer end of the hook 30 which abuts the security slot 91 may be planar as shown in FIG. 22, or may have a bumping 33 as shown in FIG. 23 or a recess 34 as shown in FIG. 24.

With reference to FIGS. 1, 3, 6, and 7, the lock core 50 may be compatible with a key or may be a combination lock. The lock core 50 has a core axle 51, and when the lock core 50 is in an unlocked state, the core axle 51 is capable of moving axially with respect to the casing 10 and tends to move toward the security slot 91 or the fixing element 20, and the core axle 51 is preferably moved via a first resilient element 71. An end of the core axle 51 directly or indirectly drives the hook 30 to move axially with respect to the fixing element 20, and the end of the core axle 51 is preferably connected to the hook base 40 and drives the hook 30 to move via the hook base 40.

The unlocking element 60 is connected to the core axle 51, and the unlocking element 60 is capable of moving the core axle 51 away from the fixing element 20. Preferably, the unlocking element 60 protrudes to an exterior of the casing 10, and is capable of being pressed toward the core axle 51; thereby the unlocking element 60 pushes the core axle 51 away from the fixing element 20 via at least one inclined surface 61; the unlocking element 60 tends to move away from the core axle 51, and the unlocking element 60 is preferably moved via a second resilient element 72, but it is not limited thereto; the unlocking element 60 may drive the core axle 51 via another way. Besides, when the lock core 50 is in a locked state, the core axle 51 is not capable of axially moving with respect to the casing 10, and thus the unlocking element 60 is not capable of being operated as well as being pressed.

With reference to FIGS. 4 and 5, to mount the security lock in the security slot 91, first operate the unlocking element 60 to move the core axle 51 in the unlocked state of the lock core 50, and thereby the hook base 40 moves the two hooks 30 away from the security slot 91 and thus the two hooks 30 retract with respect to the fixing element 20. Therefore, the fixing element 20 and the outer ends of the two hooks 30 are allowed to be inserted into the security slot 91; then when the unlocking element 60 is released, the first resilient element 71 pushes the core axle 51 to move toward the security slot 91 thereafter, and further pushes the two hooks 30 via the hook base 40. Each one of the two hooks 30 moves along one of the two guiding structures 21 of the fixing element 20 straight and obliquely as in the second embodiment or in a curved path as in the first embodiment, and thus the outer end of the hook 30 protrudes from the fixing element 20 to engage with the security slot 91. Then switch the lock core 50 into the locked state to make the unlocking element 60 inoperable, and thus the two hooks 30 keep engaging in the security slot 91.

In the aforementioned mounting process, the fixing element 20 stays static and without any displacement in the locations or the angles with respect to the casing 10 and the security slot 91, but only the two hooks 30 move, thereby preventing damage to the security slot 91.

In addition, the fixing element 20 will not move or rotate in the mounting process, thus being a steady support to hold the two hooks 30 and further supporting the two hooks steadily to engage with the security slot 91. Therefore, an overall anti-pulling performance and anti-pushing performances in two perpendicular directions are effectively enhanced.

Figure 12:
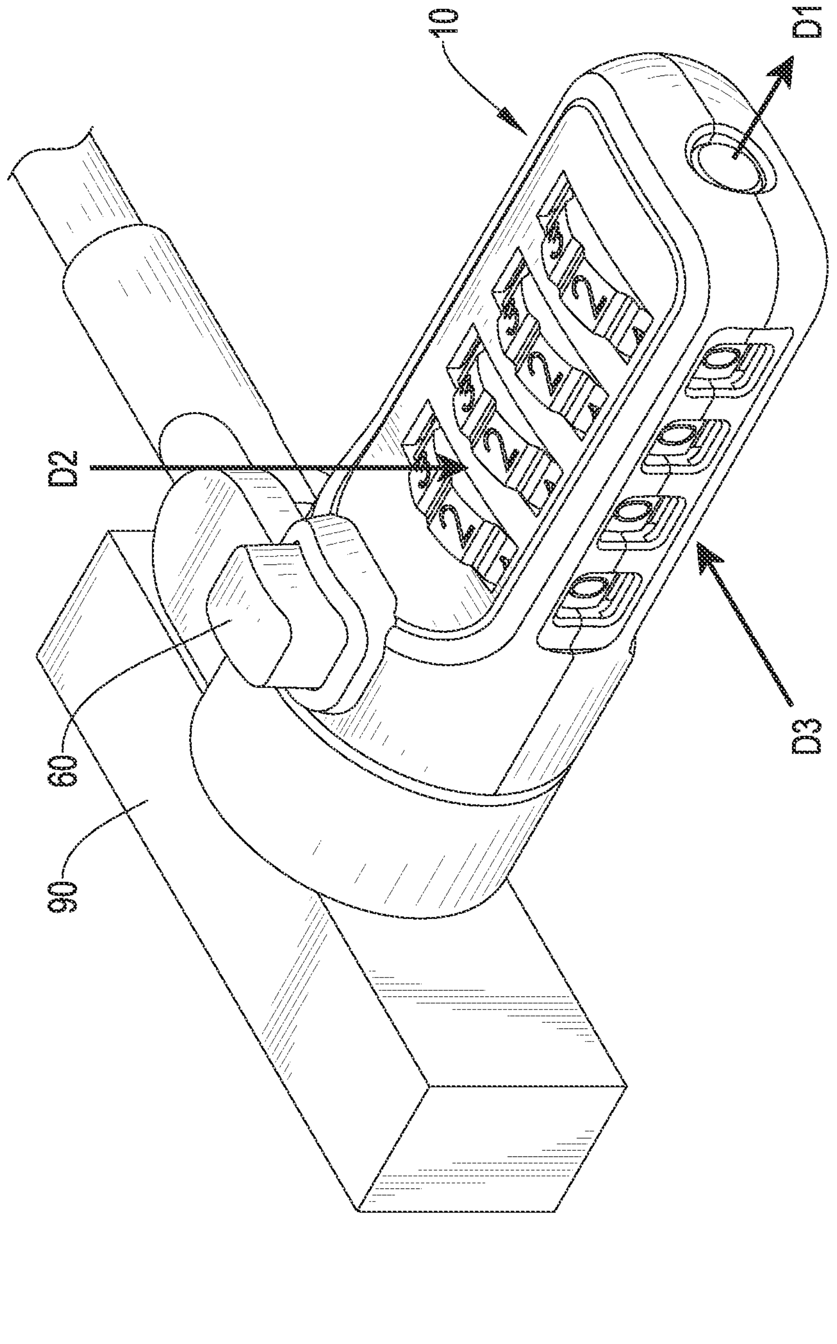
FIG. 12 is a perspective view of the first embodiment of the security lock, showing directions of an anti-pulling test and anti-pushing tests.

Besides, the hook 30 which moves in a curved path in the first embodiment is capable of protruding for a longer distance compared with the hook 30 which moves straight in the second embodiment, and with the curved track of the guiding structure 21, stability of the hook 30 in the first embodiment is enhanced, thereby enhancing the anti-pulling performance and the anti-pushing performances. To be more precise, as shown in FIG. 12, a test result of the first embodiment is as follows:

Regarding the anti-pulling performance along a pulling direction D1: a pulling test is done by engaging the two hooks 30 with a security slot 91 of an electronic device 90 which is fixed, and a string being threaded through the security lock and being pulled away from the electronic device 90 at a speed of 10 mm/min. Under the aforementioned test conditions, a result of the anti-pulling performance is more than 50 kgf.

Regarding the anti-pushing performance along a first radial direction D2: a pushing test is done with a rod pushing down the security lock along the first radial direction D2 at a speed of 10 mm/min. Under the aforementioned test conditions, a result of the anti-pushing performance is more than 50 kgf.

Regarding the anti-pushing performance along a second radial direction D3: a pushing test is done with a rod pushing the security lock along the second radial direction D3 at a speed of 10 mm/min. Under the aforementioned test conditions, a result of the anti-pushing performance is more than 50 kgf.

Therefore, the anti-pulling performance and the anti-pushing performances in two perpendicular directions of the security lock in this disclosure are indeed enhanced effectively to further enhance an anti-theft effect.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A security lock configured to fix an electronic device having a security slot; the security lock comprising:

a fixing element configured to be axially mounted in the security slot of the electronic device, and two guiding structures formed on the fixing element; and two hooks configured to move axially with respect to the fixing element, and the two hooks configured to respectively move radially outward in opposite directions along the two guiding structures of the fixing element to engage in the security slot while moving axially with respect to the fixing element;

wherein, when the fixing element is mounted in the security slot and the two hooks move with respect to the fixing element to engage in the security slot, the fixing element stays static; and wherein, when the two hooks move toward the security slot with respect to the fixing element, each one of the two hooks moves in a curved path with respect to the fixing element to engage in the security slot, and said curved path is concave outward with respect to the security slot to increase a distance between two outer ends of the two hooks when the two hooks move toward the security slot.

2. The security lock as claimed in claim 1, wherein each one of the two guiding structures of the fixing element includes at least one abutting portion; when each one of the two hooks moves with respect to the fixing element, said hook abuts the at least one abutting portion and thus moves radially outward.

3. The security lock as claimed in claim 2, wherein when each one of the two hooks moves with respect to the fixing element, said hook radially abuts the at least one abutting portion and thus moves radially outward.

4. The security lock as claimed in claim 1, wherein the security lock has a hook base connected to an inner end of each one of the two hooks, and the hook base is axially movable with respect to the fixing element; when each one of the two hooks moves away from the security slot with respect to the fixing element, the hook base guides the inner end of said hook to move radially.

5. The security lock as claimed in claim 4, wherein when the hook base moves axially with respect to the fixing element, the hook base drives the two hooks to move axially and meanwhile guides the inner end of each one of the two hooks to move radially.

6. The security lock as claimed in claim 5, wherein when the two hooks move away from the security slot with respect to the fixing element, the hook base guides the inner end of each one of the two hooks to move radially inward.

7. The security lock as claimed in claim 1, wherein each one of the two guiding portions of the fixing element includes at least one abutting portion; when each one of the two hooks moves with respect to the fixing element, said hook radially abuts the at least one abutting portion and thus moves radially outward; a fulcrum portion protrudes from a radial outer side of each one of the two hooks, and when each one of the two hooks the at least one hook moves in a curved path along the at least one abutting portion, the fulcrum portion abuts the at least one abutting portion for said hook to move in a curved path.

8. The security lock as claimed in claim 6, wherein each one of the two guiding portions of the fixing element includes at least one abutting portion; when each one of the two hooks moves with respect to the fixing element, said hook radially abuts the at least one abutting portion and thus moves radially outward; a fulcrum portion protrudes from a radial outer side of each one of the two hooks, and when each one of the two hooks moves in a curved path along the at least one abutting portion, the fulcrum portion abuts the at least one abutting portion for said hook to move in a curved path.

9. The security lock as claimed in claim 4, wherein a guiding portion is formed on the inner end of each one of the two hooks, protrudes radially inward, and is inserted into the hook base.

10. The security lock as claimed in claim 6, wherein a guiding portion is formed on the inner end of each one of the two hooks, protrudes radially inward, and is inserted into the hook base.

11. The security lock as claimed in claim 9, wherein two hook recesses are formed on the hook base and correspond to the two hooks respectively, and each one of the two hook recesses has a radial moving space and an entrance which connect to each other; a width of the entrance is smaller than a width of the radial moving space, and the guiding portion of the corresponding hook passes through the entrance to be inserted into the radial moving space.

12. The security lock as claimed in claim 10, wherein two hook recesses are formed on the hook base and correspond to the two hooks respectively, and each one of the two hook recesses has a radial moving space and an entrance which connect to each other; a width of the entrance is smaller than a width of the radial moving space, and the guiding portion of the corresponding hook passes through the entrance to be inserted into the radial moving space.

13. The security lock as claimed in claim 4, wherein a guiding portion is formed on the inner end of each one of the two hooks and protrudes toward the hook base, and the guiding portion is inserted into the hook base.

14. The security lock as claimed in claim 6, wherein a guiding portion is formed on the inner end of each one of the two hooks and protrudes toward the hook base, and the guiding portion is inserted into the hook base.

15. The security lock as claimed in claim 13, wherein two hook recesses are formed on the hook base and correspond to the two hooks respectively, and the two hook recesses extend radially; the two guiding portions of the two hooks are inserted into the two hook recesses respectively.

16. The security lock as claimed in claim 14, wherein two hook recesses are formed on the hook base and correspond to the two hooks respectively, and the two hook recesses extend radially; the two guiding portions of the two hooks are inserted into the two hook recesses respectively.

* * * * *